(12) United States Patent
Packer et al.

(10) Patent No.: US 7,165,458 B2
(45) Date of Patent: Jan. 23, 2007

(54) VACUUM GAUGE

(75) Inventors: Kenneth George Packer, Eastbourne (GB); Matthew Key, Sharnbrook (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 10/516,963

(22) PCT Filed: Jun. 6, 2003

(86) PCT No.: PCT/GB03/02452

§ 371 (c)(1),
(2), (4) Date: Sep. 19, 2005

(87) PCT Pub. No.: WO03/106954

PCT Pub. Date: Dec. 24, 2003

(65) Prior Publication Data

US 2006/0086189 A1   Apr. 27, 2006

(30) Foreign Application Priority Data

Jun. 13, 2002   (GB) ................. 0213611.7

(51) Int. Cl.
*H01J 27/00* (2006.01)
(52) U.S. Cl. .......................... 73/708; 313/230
(58) Field of Classification Search ............ 73/708, 73/700, 756; 313/230, 93
See application file for complete search history.

(56) References Cited

U.S. PATENT DOCUMENTS 3,199,356 A * 8/1965 Andriulis ............... 73/755
3,915,009 A * 10/1975 Worden et al. ............ 73/701
4,307,323 A   12/1981 Bills et al.
4,729,241 A   3/1988 Flosbach et al.
5,602,441 A   2/1997 Ohsako et al.

FOREIGN PATENT DOCUMENTS

| DE | 10 94 341 B | 12/1960 |
|----|----|----|
| GB | 827 311 A | 2/1960 |
| JP | 560011332 A | 2/1981 |
| JP | 560044816 A | 4/1981 |
| JP | 2000241281 A | 9/2000 |

(Continued)

OTHER PUBLICATIONS

International Search Report of PCT/GB03/02452; Date of publication of the International Search Report: Jun. 3, 2004.

(Continued)

*Primary Examiner*—Edward Lefkowitz
*Assistant Examiner*—Andre Allen
(74) *Attorney, Agent, or Firm*—Ira Lee Zebrak; Mary K. Nicholes

(57) ABSTRACT

A thermal conductivity type pressure gauge comprises a gauge head (2) being rotatably mountable in a vessel whose environmental pressure is to be measured and an elongate electrical filament (6) mounted in the gauge head, the gauge head (2) having an inlet where through the electrical filament is exposed to the environmental pressure within the vessel and the filament (6) having directional component lengths in two orthogonal axes, one of the orthogonal axes X—X being parallel to the axis of rotation of the gauge head (2).

16 Claims, 2 Drawing Sheets

FOREIGN PATENT DOCUMENTS

SU        0491858 A    11/1975

OTHER PUBLICATIONS

United Kingdom Search Report of Application No. GB 0213611.7; Date of search: Dec. 10, 2002.
Abstract of JP 2000241281 A, "Hot Cathode Ionization Vacuum Gauge," Anelva Corp. (Sep. 8, 2000).

Abstract of JP 56011332 A, "Hot Cathode Ionization Vacuum Gauge," Tokyo Shibaura Electric Co. (Feb. 4, 1981).
Abstract of SU 491858 A, "Thermal Vacuum Meter with Pirani Type Transducer-Can be Operated at Constant Temperature, or Current or Voltage," Lengd Electrotech (Nov. 15, 1975).
Abstract of JP 56044816 A, "Vacuum Gauge," Tokyo Shibaura Electric Co. (Apr. 24, 1981).

* cited by examiner

VACUUM GAUGE

The present invention relates to pressure gauges and in particular to gauges used to monitor gas pressure in a vacuum and which operate on the physical principle of thermal conductivity.

More than one type of vacuum gauge is known. Different types of gauge operate utilising different physical principles. For example, so called "ion gauges" monitor ionisation current to provide an indicator of changes in pressure in the vacuum environment. The thermal conductivity sensors to which the present invention relates use the physical principle of thermal conductivity of gases. All other factors being equal, the thermal conductivity of a gas increases with the number of molecules present in a given space and hence varies with pressure.

A typical thermal conductivity gauge comprises a fine, heated wire filament. Heat is lost from the filament by conduction through gases in the monitored environment. In a common configuration of thermal conductivity gauge, the power supply to the heated wire filament is varied so as to maintain the filament at a constant temperature to compensate for the heat loss. As gas pressure in the monitored environment increases, there are more gas collisions with the heated filament and faster removal of heat from the filament, consequently, the power required to maintain the constant filament temperature increases with the gas pressure. In one example of a thermal conductivity gauge known as the Pirani gauge, the heated filament forms one branch of a Wheatstone bridge. Thus, the voltage supplied to keep the Wheatstone bridge balanced is proportional to the gas pressure in the monitored environment.

Thermal conductivity gauges operate well in environments at pressures up to about 100 mbar, however, at pressures upwards of this figure the heat conduction becomes essentially independent of pressure, heat conduction effects plateau and the sensitivity of the gauge is reduced. For applications in these higher pressure ranges, thermal conductivity gauges have been adapted to encourage optimum cooling by convection. This is achieved by orienting the heated filament wire to be perpendicular to the direction of gravitational pull.

These "convection gauges" typically comprise an elongate cylindrical housing having a heatable wire filament passing through the centre of the cylinder in a direction parallel to its longitudinal axis. In use, the gauge is positioned in the environment to be monitored with the axis of the cylinder substantially perpendicular to the direction of gravitational pull.

A disadvantage of such an arrangement is that if the gauge is not oriented horizontally as described, heat loss from convection currents is greatly reduced and the gauge does not provide an accurate response. Once it has been wrongly positioned in a vacuum environment, it is difficult for the orientation of the gauge to be conveniently adjusted.

Russian patent publication SU 49185 discloses a convection gauge having two heated filaments arranged perpendicularly with one another. In use the two filaments are arranged one vertically (i.e. in parallel with the direction of gravitational pull) the other horizontally. A transducer monitors heat losses due to convection in each of the filaments. The transducer is enveloped in a high thermal conduction material which uniformly distributes temperature fluctuation of the ambient environment between the two filaments.

The present invention aims to provide a vacuum gauge which has a single filament, can be used in a plurality of orientations and which is less cumbersome than the gauge of SU 49185.

In accordance with the present invention, a thermal conductivity type pressure gauge comprises a gauge head being rotatably mountable in a vessel whose environmental pressure is to be measured and an elongate electrical filament mounted in the gauge head, the gauge head having an inlet wherethrough the electrical filament is exposed to the environmental pressure within the vessel and the filament having directional component lengths in two orthogonal axes, one of the orthogonal axes being parallel to the axis of rotation of the gauge head.

More succinctly, the filament is angled to the axis of rotation at an angle other than 0 or 90 degrees. Preferably the angle is in the range 30 to 60 degrees, more preferably 40 to 50.

By arranging the filament at an angle to the axis of rotation of the gauge head, it possible through simple rotation of the gauge head to position the filament with a substantial horizontal component with respect to the direction of gravitational pull more than once per full rotation, thus, the gauge can be positioned in a plurality of orientations and, through rotational adjustment about the axis, the filament can be aligned horizontally with respect to the direction of gravitational pull.

Conveniently, the filament is arranged to cross the axis of rotation.

Desirably, the filament is angled to the axis at around 45 degrees such that with the axis orientated horizontally or vertically the directional component lengths of the filament are approximately equal in horizontal and vertical directions. Such an embodiment,may be mounted in any vertical or horizontal surface of a vessel and if mounted at angles in between by simple rotation of the gauge about the axis, the filament may be aligned substantially horizontally.

The filament may comprise a straight length wire. Alternatively, the filament may comprise a spiralled or crimped length of wire The gauge of the present invention makes use of the fact that all that is required to sustain convection when in use is a filament with a horizontal component. By mounting the filament such that it has directional component lengths in two orthogonal axes one being the axis used for connection to the vacuum vessel, a horizontal component is produced when the gauge head is mounted in various orientations.

An embodiment of the invention will now be described, by way of example, reference being made to the Figures of the accompanying diagrammatic drawing in which.

Figure 1:
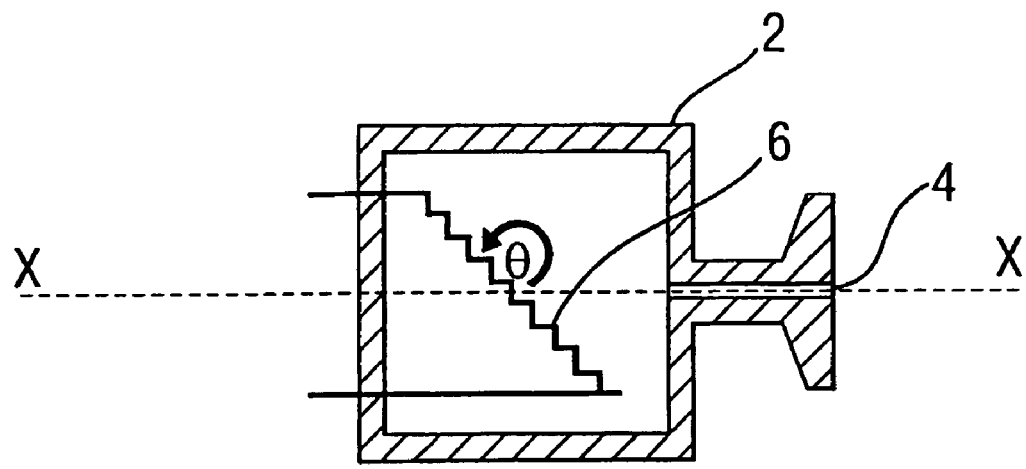
FIG. 1 is a diagrammatic sketch of a vacuum gauge in a first orientation according to the present invention.

As shown, a vacuum gauge for measuring the vacuum in a vessel (not shown) includes a gauge head 2 substantially closed but having an inlet at one end for connection to the vessel. Located within the gauge head 2 is an electrical filament 6. The filament 6, as shown with reference to FIG. 1, is orientated at an angle θ degrees which is greater than zero measured with respect to the longitudinal axis X—X of the gauge head 2. In other words, the electrical filament 6 has directional component lengths in two orthogonal axes, one being the axis X—X used for connection to the vessel whose vacuum is to be measured.

Figure 2:
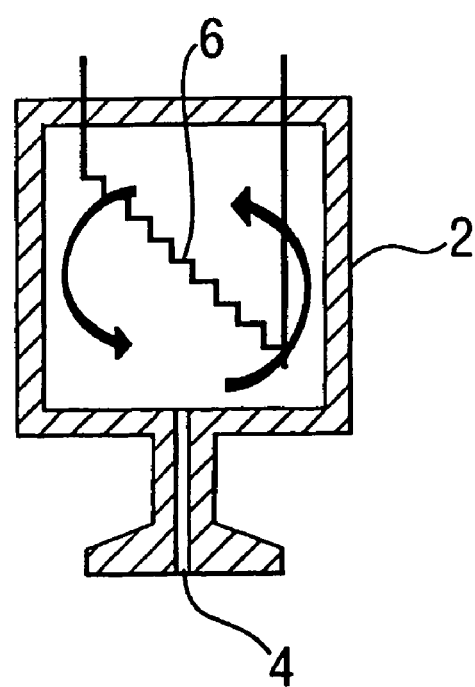
FIG. 2 is a diagrammatic sketch of the vacuum gauge of FIG. 1 in a different orientation.

It will be observed that by orientating the filament 6 at an angle θ degrees with respect to the axis X—X of the gauge head 2, the filament 6 has a horizontal component when mounted with the axis of the gauge head 2 horizontally (FIG. 1), vertically (FIG. 2) and orientations between FIGS. 1 and 2.

Provided that the filament 6 has a horizontal component, convection currents can occur and the power required to maintain the filament 6 at the same temperature will vary with pressure.

Figure 3:
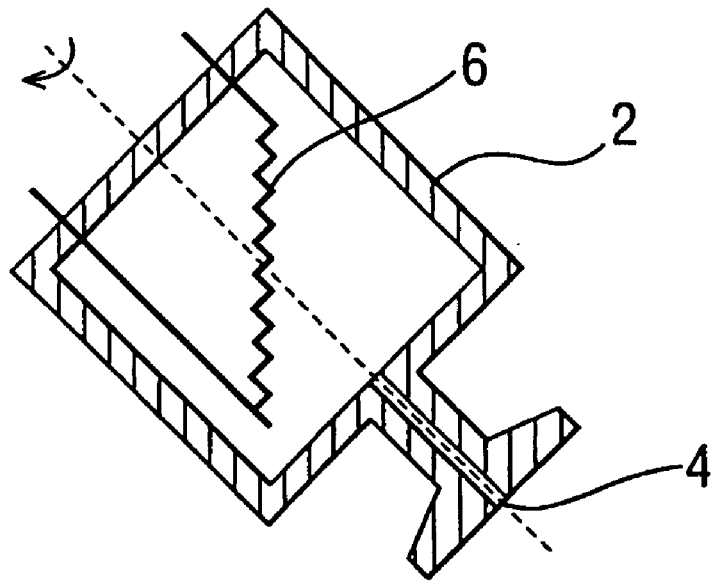
FIG. 3 is a diagrammatic sketch of the vacuum gauge similar to FIG. 1 in yet a further orientation.
Figure 4:
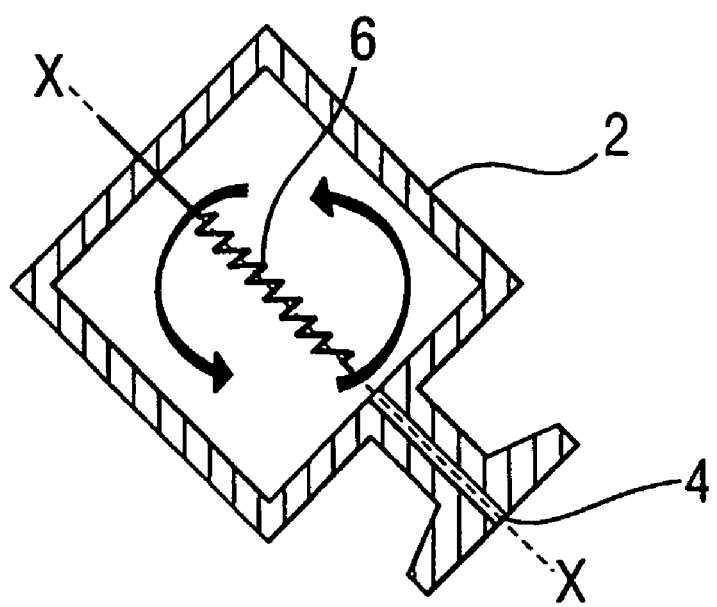
FIG. 4 is a diagrammatic sketch in which the vacuum gauge head shown in FIG. 3 has been twisted about the longitudinal axis of the gauge head.

Referring in particular to FIGS. 3 and 4 in one orientation of the gauge head 2 the filament 6 (as illustrated in FIG. 3) has no horizontal component. However, by simply rotating the gauge head 2 about its axis as illustrated in FIG. 4, a horizontal component can be obtained.

Effectively convection based measurements of vacuum can be obtained with the gauge head 2 mounted in any orientation.

By mounting the filament 6 diagonally across the axis of the gauge head 2 a longer filament for a given outside dimension of the gauge head can be used. It also enables the vacuum gauge to be manufactured more easily and cheaply than known vacuum gauges.

The invention claimed is:

1. A thermal conductivity type pressure gauge comprises a gauge head being rotatably mountable in a vessel whose environmental pressure is to be measured and an elongate electrical filament mounted in the gauge head, the gauge head having an inlet wherethrough the electrical filament is exposed to the environmental pressure within the vessel and the filament having directional component lengths in two orthogonal axes, one of the orthogonal axes being parallel to the axis of rotation of the gauge head.

2. A thermal conductivity type pressure gauge as claimed in claim 1 wherein the gauge is a Pirani gauge.

3. A thermal conductivity type pressure gauge as claimed in claim 1 wherein the directional component lengths of the filament are substantially equal and the filament subtends an angle to the axis of rotation of about 45 degrees.

4. A thermal conductivity type pressure gauge as claimed in claim 1 wherein the directional component lengths are such as to subtend the filament an angle to the rotational axis of between 30 and 60 degrees.

5. A thermal conductivity type pressure gauge as claimed in claim 4 wherein the filament subtends an angle of between 40 and 50 degrees.

6. A thermal conductivity type pressure gauge as claimed in claim 1 wherein the filament crosses the axis of rotation.

7. A thermal conductivity type pressure gauge as claimed in claim 1 wherein the filament comprises a length of spiraled or crimped wire.

8. A thermal conductivity type pressure gauge as claimed in claims 1 wherein the filament comprises a straight length of wire.

9. A thermal conductivity type pressure gauge as claimed in claim 1 wherein the gauge is configured for use in a vacuum.

10. A thermal conductivity type pressure gauge as claimed in claim 2 wherein the directional component lengths of the filament are substantially equal and the filament subtends an anile to the axis of rotation of about 45 degrees.

11. A thermal conductivity type pressure gauge as claimed in claim 2 wherein the directional component lengths are such as to subtend the filament an angle to the rotational axis of between 30 and 60 degrees.

12. A thermal conductivity type pressure gauge as claimed in claim 4 wherein the filament crosses the axis of rotation.

13. A thermal conductivity type pressure gauge as claimed in claim 6 wherein the filament comprises a length of spiraled or crimped wire.

14. A thermal conductivity type pressure gauge as claimed in claim 6 wherein the filament comprises a straight length of wire.

15. A thermal conductivity type pressure gauge as claimed in claim 13 wherein the gauge is configured for use in a vacuum.

16. A thermal conductivity type pressure gauge as claimed in claim 14 wherein the gauge is configured for use in a vacuum.

* * * * *